United States Patent

Wang et al.

[11] Patent Number: 5,884,600
[45] Date of Patent: Mar. 23, 1999

[54] ALUMINUM BORE ENGINE HAVING WEAR AND SCUFF-RESISTANT ALUMINUM PISTON

[75] Inventors: Yucong Wang, Saginaw; Peter Vernia; Simon Chin-Yu Tung, both of Rochester Hills, all of Mich.

[73] Assignee: General Motors Corporation, Detroit, Mich.

[21] Appl. No.: 27,327

[22] Filed: Feb. 20, 1998

[51] Int. Cl.⁶ ........................................................ F16J 1/04
[52] U.S. Cl. .......................................... 123/193.6; 92/223
[58] Field of Search ............................ 123/193.6; 92/223

[56] References Cited

U.S. PATENT DOCUMENTS

| | | | |
|---|---|---|---|
| 2,817,562 | 12/1957 | Fleming et al. | 309/4 |
| 3,781,205 | 12/1973 | Cairns et al. | 252/12.6 |
| 3,890,950 | 6/1975 | Haldeman | 123/193 P |
| 4,395,442 | 7/1983 | Meise et al. | 427/236 |
| 4,656,711 | 4/1987 | Yagi et al. | 29/156.5 R |
| 4,831,977 | 5/1989 | Presswood | 123/193 P |
| 5,239,955 | 8/1993 | Rao et al. | 123/193.4 |
| 5,313,919 | 5/1994 | Rao et al. | 123/193.4 |
| 5,469,777 | 11/1995 | Rao | 123/193.6 |
| 5,490,445 | 2/1996 | Rao | 123/193.6 |

*Primary Examiner*—Marguerite McMahon
*Attorney, Agent, or Firm*—Lawrence B. Plant

[57] ABSTRACT

A reciprocating engine having an aluminum engine block, and an aluminum piston wherein the piston's skirt has a hard anodized first layer directly on the aluminum and a composite polymer coating atop the hard anodized layer.

3 Claims, 1 Drawing Sheet

ALUMINUM BORE ENGINE HAVING WEAR AND SCUFF-RESISTANT ALUMINUM PISTON

TECHNICAL FIELD

This invention relates to reciprocating engines having aluminum cylinder bores and wear and scuff-resistant aluminum pistons.

BACKGROUND OF THE INVENTION

It is known to make reciprocating engine blocks from aluminum alloys such as the Al—Si alloys. Heretofore, eutectic and hypoeutectic aluminum-silicon alloy engine blocks have been made with iron cylinder liners for use with aluminum-silicon pistons. Iron liners, however, add weight and cost to the engine, and undesirably have a different thermal expansion than the aluminum block and piston. Alternatively, one engine manufacturer has made an engine block by positioning a porous preformed liner comprising alumina fibers and silicon carbide particles in a mold, and squeeze casting a hypoeutectic Al—Si alloy thereabout so as to infiltrate the preformed liner and form the cylinder wall. That engine was run with iron-plated pistons to avoid scuffing. Finally, blocks have been cast from hypereutectic aluminum-silicon alloy (e.g., 390 alloy), and the aluminum matrix etched back to expose hard silicon on the cylinder wall surface. These hypereutectic aluminum bore engines were run with aluminum pistons coated with iron, chromium, nickel, varnishes containing $MoS_2$ or graphite, or ceramic oxide particles in an epoxy resin matrix (see Meise U.S. Pat. No. 4,395,442). See also, Rao et al U.S. Pat. No. 5,313,919, Rao et al U.S. Pat. No. 5,239,955, Presswood U.S. Pat. No. 4,831,977, Haldeman U.S. Pat. No. 3,890,950, and Fleming et al U.S. Pat. No. 2,817,562 for piston coated with lubricious films to reduce the sliding friction between the skirt and the cylinder wall. Some of those lubricious films comprise solid lubricious particles entrained in a heat resistant polymer matrix, and are known as "solid film lubricants" or "composite polymer coatings".

It is desirable to make engine blocks from eutectic or hypoeutectic Al—Si alloys, rather than hypereutectic alloys, because the eutectic and hypoeutectic alloys are cheaper and have good castability and machineability. It is likewise desirable to eliminate the iron liners and $Al_2O_3$—SiC preforms heretofore used with eutectic and hypoeutectic alloy blocks in order to reduce weight and cost, as well as improve heat transfer. However, running aluminum pistons against aluminum cylinder walls results in significant scuffing (i.e., adhesive wear between two parts sliding together in a lubricant-starved condition) of the cylinder walls and the piston skirts. Excellent scuffing resistance can be obtained between eutectic and hypocutectic blocks and aluminum pistons by coating the piston skirt with solid film lubricants. However, the wear resistance and durability of such coatings in this application is inadequate for a long-lived engine.

SUMMARY OF THE INVENTION

By increasing the wear resistance of a composite polymer coating applied to a piston, the present invention provides long term scuff resistance between aluminum pistons run against aluminum-silicon cylinder walls, regardless of whether the cylinder wall comprises a hypoeutectic, eutectic, or hypereutectic Al—Si alloy. In accordance with the present invention, there is provided a reciprocating engine having an aluminum-silicon alloy block including at least one internal cylinder wall that defines a cylinder bore and has the same composition as the rest of the block. Hence if the block is cast from hypoeutectic Al—Si alloy, the cylinder wall will have that same composition. The cylinder wall is machined to provide a surface finish having an arithmetic mean average surface roughness, $R_a$, of 0.09 to 0.25 micron. The engine also includes an aluminum-silicon alloy piston that has a skirt having an external surface that confronts the cylinder wall. The surface of the skirt has a hard anodized coating adhering thereto, and a composite polymer coating formed atop the hard anodized coating. The composite polymer coating comprises a plurality of solid lubricious particles in a heat-resistant polymer matrix capable of withstanding the operating temperatures of the engine. The hard anodized coating underlying the composite polymer coating promotes a much lower wear rate, and more consistent wear of the aluminum cylinder wall as well as a much lower wear rate of composite polymer coating on the piston, and thereby extends the useful life of the engine. Tests have shown that the hard anodized underliner reduces the wear rate of the composite polymer coating by as much as 30% compared to pistons having only the composite polymer coating without an anodized underlayer. Significant wear rate reduction of the cylinder wall has also been observed. In accordance with a preferred embodiment of the invention, the hard anodized coating will have a thickness of about 15 to about 25 microns (most preferably about 20 microns), and the composite polymer coating will have a thickness of about 12 to about 18 microns (most preferably about 15 microns). The composite coating will preferably contain lubricious particles selected from the group consisting of graphite, carbon monofluoride, boron nitride, and the sulfides, selenides and tellurides of molybdenum, tungsten and titanium, which are held within a polymer matrix selected from the group consisting of high temperature epoxy, heat curable polyimides, polyamideimide, polyphenylene sulphide and polyaryl sulfone.

BRIEF DESCRIPTION OF THE DRAWINGS

The invention will better be understood when considered in the light of the following detailed description of a specific embodiment thereof which is given hereafter in conjunction with the drawings in which.

DESCRIPTION OF THE PREFERRED EMBODIMENT

Figure 1:
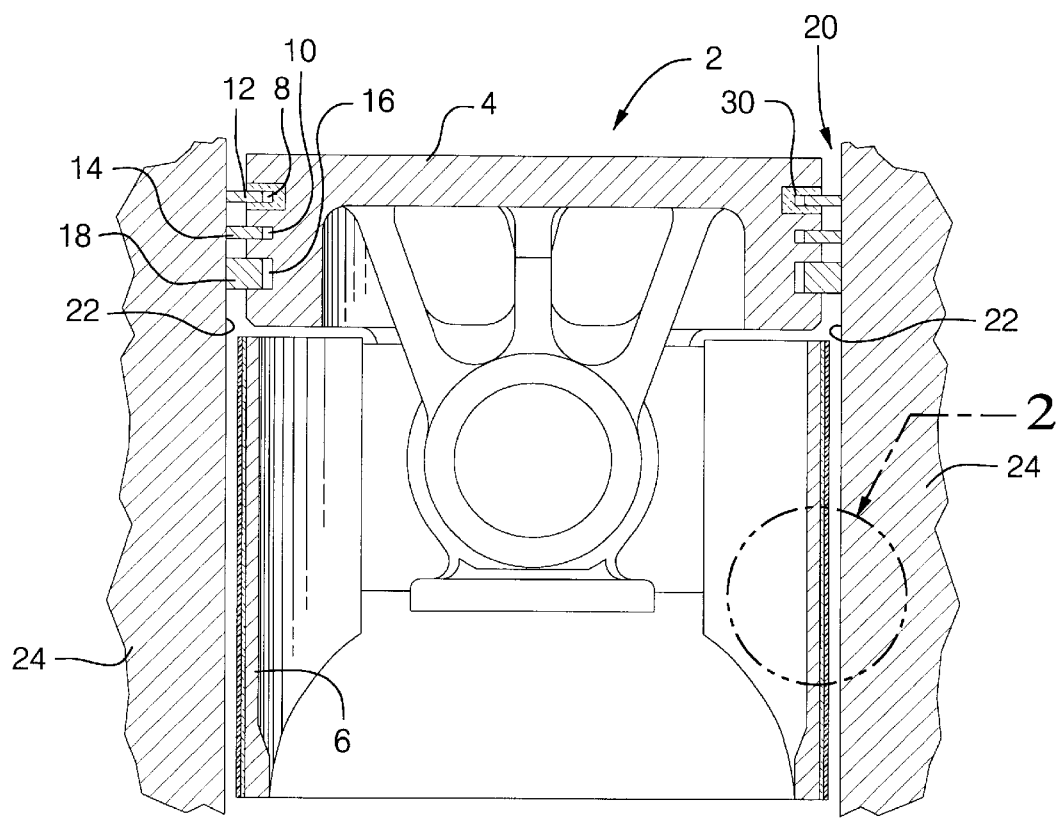
FIG. 1 is a sectioned side view of a piston and surrounding block.

FIG. 1 depicts an aluminum piston 2 having a crown 4 and a skirt 6 depending from the crown 4, as well as unnumbered internal strengthening structure and bore for receiving a wrist pin for attaching a piston rod to the piston 2. A pair of upper ring grooves 8 and 10 receive compression rings 12 and 14, and a lower ring groove 16 receives an oil ring 18. The piston 2 reciprocates in a cylinder bore 20 defined by an annular cylinder wall 22 in an engine block 24 which is cast from an aluminum-silicon alloy, and preferably from an eutectic or hypoeutectic Al—Si alloy, though it could also be cast from an hypereutectic alloy.

Figure 2:
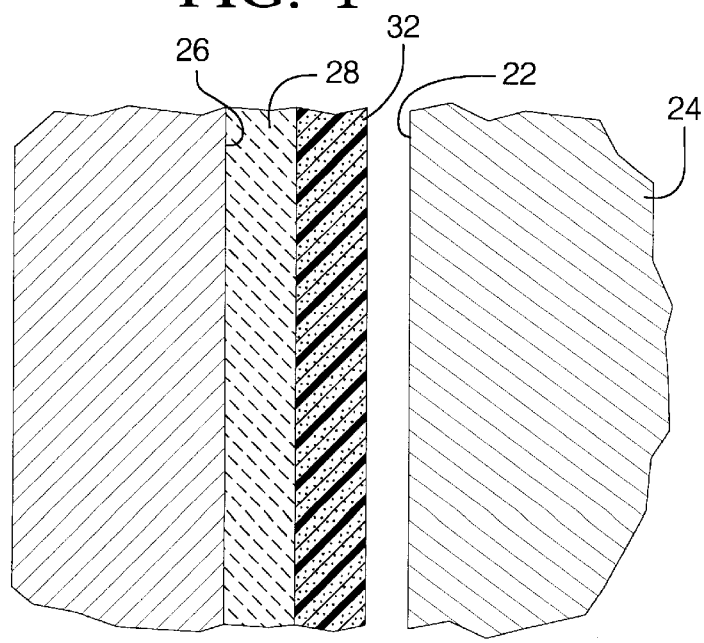
FIG. 2 is a magnified view of the surface of the piston where indicated as No. 2 on FIG. 1.

In accordance with the present invention and as best shown in FIG. 2, the skirt 6 has an external surface 26 which has been hard anodized so as to grow a dense aluminum oxide layer 28 on the surface 26. By hard anodized coating is meant an aluminum oxide layer electrochemically grown, in situ, on the surface of the aluminum, and having a Knoop microhardness (at 5 gram load) of at least 540. Oxide layers in accordance with the present invention will have a Knoop microhardness (i.e., @ 5 gram load) between about 540 and about 600, with about 560 being preferred. Aluminum anodizing is a well known process whereby an aluminum substrate is made the anode in an electrolyte, and, with the passage of electrical current, undergoes electrochemical conversion of its surface to aluminum oxide by reaction with oxygen provided by the electrolytic dissociation of water. While a number of different acids have been used, chromic acid, sulfuric acid, and oxalic acid are the most common electrolytes, with sulfuric acid being the most popular. Sulfuric acid is preferred because it is low cost, quick and can be done at comparatively low operating voltages owing to the high conductivity of the sulfuric acid and its ability to penetrate the film to the underlying metal. The properties of the anodic coating depend on the electrolyte used, its concentration and temperature, the current used and the processing time. For hard coatings, subambient temperatures (e.g., ca $-2°$ C. to $5°$ C.) and moderately concentrated sulfuric acid electrolytes are preferred (e.g., about 10% to 20% by weight). A 12% to 15% by weight $H_2SO_4$ electrolyte is preferred.

To grow a suitably hard coating according to a preferred process, the piston is first chemically cleaned to remove all grease, corrosion products, and native (i.e., naturally occurring) oxide. One suitable cleaning technique includes scrubbing the piston in a room temperature soap solution followed by a cold water rinse and subsequent immersion in a common commercial inhibited alkaline cleaning solution at about $60°$ C. for about 3 minutes. Cold rinsing completes the cleaning operation. Other cleaning regimens that accomplish the same result are also effective. The cleaned piston is then immersed in a $0°$ C. electrolyte comprising 12% $H_2SO_4$, and anodized at a current density of about 3 $A/dm^2$ for about 8 to about 20 minutes depending on how thick of coating is desired. Coating thicknesses will generally be in the range of about 8 microns to about 25 microns with about 20 microns being preferred. Under the aforesaid temperature, concentration and current density conditions, it takes about 10 minutes to produce an oxide having a thickness of about 20 microns.

Before anodizing, the piston is suitably masked to control where the oxide is formed and exclude areas where oxide is not to be formed. In this regard, at least the crown would typically be covered with the masking agent so that only the skirt is anodized. On the other hand, it is known to anodize the inside of the top compression ring groove 8 to increase hot scuffing or microwelding resistance between the ring 12 and the groove 8. Accordingly, any masking that is done may leave the top compression ring groove 8 exposed so that a layer 30 of oxide may be formed therein at the same time as the skirt 6 is coated.

Following anodizing and if exposed to a dirty environment, the pistons may be cleaned with soap and water and dried before applying a composite polymer coating 32. Following cleaning, a composite polymer coating is deposited atop the anodized layer. Such coatings preferably have a thickness between about 12 microns and about 18 microns, and comprise lubricious solid particles (e.g., graphite, carbon monofluoride, boron nitride, and the sulfides, selenides and tellurides of molybdenum, tungsten and titanium), entrained in a heat resistant (i.e., sufficient to survive engine operating temperatures) polymer such as high temperature epoxy, heat curable polyimides, polyamideimide, polyphenylene sulphide and polyaryl sulfone. One such coating useful with the present invention comprises about 5% to about 30% by volume graphite in polyamideimide. Another suitable composite polymer coating comprises about 2% to about 20% by volume graphite particles and about 2% to about 20% by volume $MoS_2$ in polyamideimide. Solutions for depositing the composite polymer coatings are commercially available. One such coating solution comprises 31% by weight polyamideimide, 17% by weight graphite and 51% by weight N-methylpyrolidone and is available from the Dow Corning Corporation. Another such solution comprises 10 $Mg/m^3$ $MoS_2$, 25 $Mg/m^3$ graphite, 434 $Mg/m^3$ xylene, 90 $Mg/m^3$ dioxane and 35 $Mg/m^3$ dimethylacetimide, and is available from Kawamura Research Laboratories, Inc. The lubricious particles can be either equiaxed or elongated in the form of fibers ranging in length form about 3 to about 15 microns, and diameter between 1 and 5 microns. The composite polymer coatings of the present invention may be applied in a variety of ways including spraying, silk screening, or pad printing techniques known to those skilled in the art. During application the polymer is dissolved in a suitable solvent therefor. Following coating, the coated pistons are dried to remove the solvent. When polyamideimide is used as the polymer matrix, the piston is baked at about $180°$ C. to about $200°$ C. for about 15 to about 60 minutes to cure the polymer. Other binders will require different times and temperatures for curing, as appropriate.

An important aspect of the present invention is the smoothness of the cylinder wall surface. In this regard, the cylinder wall surface is honed (e.g., with diamond tooling) to an arithmetic mean average surface roughness, $R_a$, of 0.09 to about 0.25 to reduce abrasion of the composite polymer coating by the cylinder wall. By contrast, cast iron cylinder walls are typically honed to arithmetic mean average surface roughness, $R_a$, of about 0.32 to 0.80, and etched hypereutectic Al—Si cylinder walls have an $R_a$ of about 0.20–0.30. Machined, but unetched, hypereutectic alloy could be used successfully with this invention. When the bore surface has a roughness less than 0.25 micron, the bore surface gets progressively smoother with continued running of the piston thereagainst. Conversely however, when the surface roughness is greater than 0.25 micron, the bore surface becomes progressively rougher with continued running of the piston thereagainst and the wear rate of the composite polymer coating increases significantly. When the bore surface is less than 0.09 micron, oil retention is not good, and insufficient oil is present for adequate lubrication.

Accelerated bench tests (i.e., using a Cameron Plint Reciprocating Machine), and engine dynamometer tests were conducted to evaluate wear and scuff resistances. These tests were run on pistons coated (1) with only a composite polymer coating, and (2) with a composite polymer coating over a hard anodized underlayer on the surface of the piston. The pistons were run against aluminum cylinder bore surfaces having silicon contents between 7% and 18% by weight.

In the Cameron Plint bench test, a section of the piston skirt is rubbed back and forth against a section of the cylinder bore surface. When the test is performed with lubrication, it is a wear test. When it is performed without lubrication, it is a scuff test. In the wear test, a load which created a maximum Hertz contact stress of 10 MPa was applied at $125°$ C. The lubricant was SAE 5W30. The stroke was 6.77 mm with a reciprocating frequency of 10 Hz. The test duration was 20 hours. The wear depths of the tested samples were then measured. In the scuff test, a section of the piston skirt was rubbed against a section of the cylinder bore surface under different loads with the maximum Hertz contact stress in the range of 4–10 MPa. The test temperature was 85° C., and duration was 15 minutes. Changes in the friction and the contact electric resistance between the two samples were continuously monitored. Increase in the friction and decrease in the contact electric resistance indicated that the scuffing occurred during the test. The load and the time to the onset of scuffing were used to rank the scuff resistance.

These tests showed that composite polymer coatings alone (i.e., no anodized undercoat) or atop a hard anodized coating had superior scuffing resistance over pistons plated with iron or Ni-based alloys when run against hypoeutectic, hypereutectic or eutectic alloy bores. These tests also showed that composite polymer coatings atop a hard anodized coating generated much lower (about 1/5 to about 1/3) and more consistent wear on aluminum bore surfaces than the same composite coating directly atop the aluminum. In this regard, after 20 hours of wear bench testing the thickness of the composite polymer coating was measured and compared to its starting thickness. These tests demonstrated that the pistons having the hard anodized undercoating had an average of about 30% less wear than those without the oxide underlayer. Finally, engines assembled with pistons with the composite polymer coating atop an anodized underlayer and both a hypo and hyper Al—Si cylinder wall surface passed both the Reynolds Metals Company's cold scuffing test, and General Motors Corporation's hot scuffing test.

While the reason for the increase in wear resistance attributed to the anodize coating is not known, it is believed that it occurs either because (a) the hard anodizing provides a hard and solid substrate which better supports the soft polymer coating than the uncoated aluminum, or (b) the hard anodizing provides a slightly rough surface receiving the composite polymer coating which promotes better adhesion of the composite polymer coating to the piston.

While the invention has been disclosed in terms of certain specific embodiments thereof it is not intended to be limited thereto but only to the extent set forth hereafter in the claims which follow.

We claim:

1. A reciprocating engine having a first aluminum alloy block, at least one internal cylinder wall in said block comprising said first aluminum alloy and defining a cylinder bore, and a second aluminum alloy piston reciprocating in said bore, said wall having an arithmetic mean average surface roughness, $R_a$ of 0.09 to 0.25 micron, and said piston comprising a skirt having an external surface confronting said wall, said surface having a first hard anodized coating adhering to said surface, and a second composite polymer coating atop said hard anodized coating and comprising a plurality of solid lubricious particles in a heat resistant polymer matrix capable of withstanding the operating temperatures of said engine.

2. An engine according to claim 1 wherein said hard anodized coating has a thickness of about 8 to about 25 microns, and said composite polymer coating has a thickness of about 12 to about 18 microns.

3. An engine according to claim 1 wherein said lubricious particles are selected from the group consisting of graphite, carbon monofluoride, boron nitride, and the sulfides, selenides and tellurides of molybdenum, tungsten and titanium, and said polymer matrix is selected from the group consisting of high temperature epoxy, heat curable polyimides, polyamideimide, polyphenylene sulphide and polyaryl sulfone.

* * * * *